(No Model.)

W. SUTTON.
SWING BEARING FOR STREET CARS.

No. 364,192. Patented May 31, 1887.

Attest:
H. S. Knight
W. C. Knight

Inventor:
William Sutton.
By Knight Bro.
Attys.

UNITED STATES PATENT OFFICE.

WILLIAM SUTTON, OF ST. LOUIS, MISSOURI.

SWING-BEARING FOR STREET-CARS.

SPECIFICATION forming part of Letters Patent No. 364,192, dated May 31, 1887.

Application filed June 30, 1886. Serial No. 206,724. (No model.)

*To all whom it may concern:*

Be it known that I, WILLIAM SUTTON, of the city of St. Louis, in the State of Missouri, have invented a certain new and useful Improvement in Swing-Bearings for Street-Cars, of which the following is a full, clear, and exact description, reference being had to the accompanying drawings, forming part of this specification, and in which—

Figure 1:
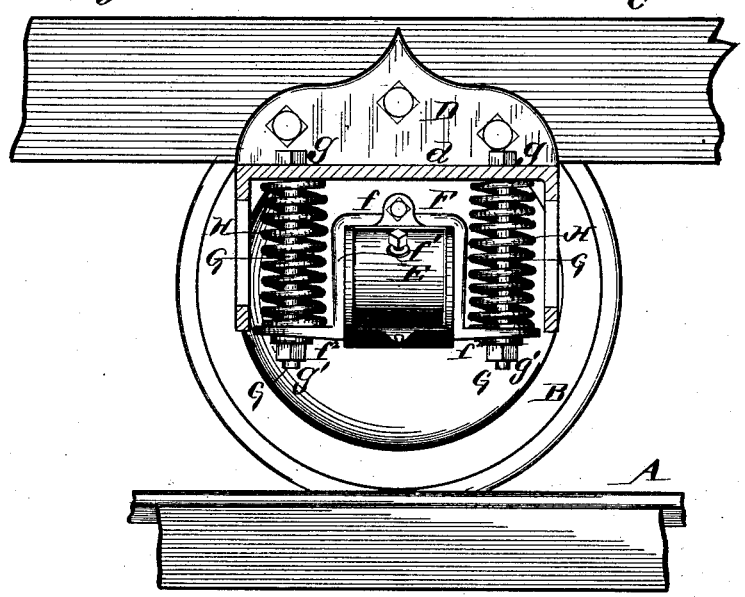
Figure 2:
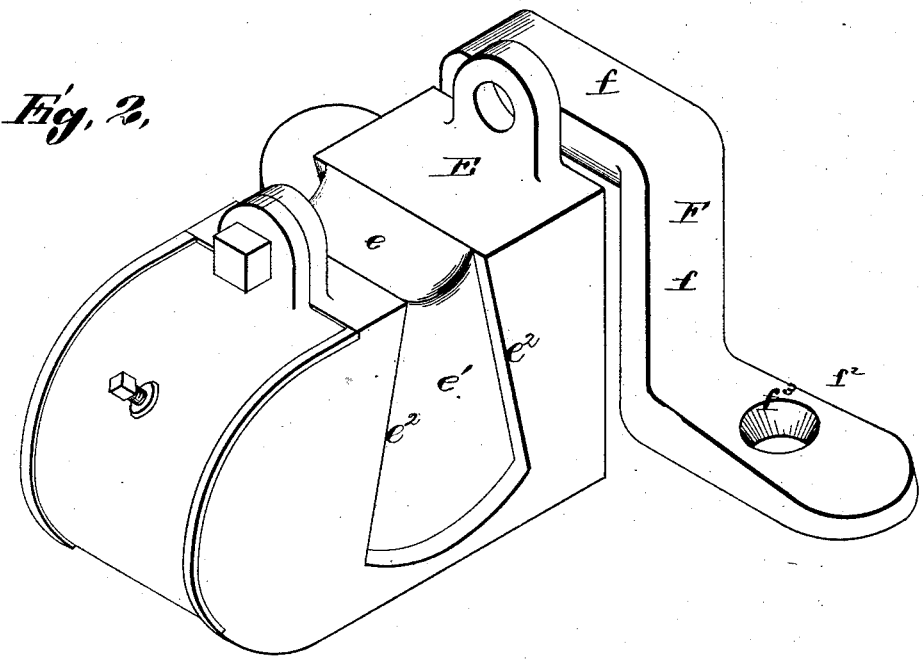

Figure 1 is a side elevation of the improvement, the pedestal being in longitudinal section. Fig. 2 is an enlarged perspective view of the axle-box and hanger or yoke disconnected.

This is a simple, cheap, durable, and effective device, and relates to those devices by which a swing-bearing is given to the car-body upon the axle-boxes by means of a swing hanger or yoke saddled upon the box and carrying the sustaining springs.

A represents a track-rail, B a car-wheel, C a car-sill, and D the pedestal, the latter being shown in longitudinal vertical section.

E is the axle-box, having formed in its top a rounded groove or saddle, $e$, extending from side to side of the box, to receive the central part, $f$, of the hanger or yoke F. In the sides of the box are recesses $e'$, within which the vertical parts $f'$ of the yoke oscillate. The edges $e^2$ of the recesses may limit the oscillation of the yoke or prevent extreme oscillatory movement.

It will be seen that the under side of the part $f$ of the yoke is rounded, so as to fit the rounded groove or saddle $e$, so that the oscillation of the yoke upon the box shall be easy.

The ends $f^2$ of the yoke extend about horizontally from the sides of the box and have each a hole, $f^3$, for the passage of the coupling-bolts G, which connect the ends of the yoke to the top, $d$, of the pedestal. The sides of the holes $f^3$ flare upwardly to allow motion of the bolts G. The heads $g$ of the bolts are shown above the top $d$, and the nuts $g'$ beneath the ends of the yoke. The body of each bolt is surrounded by a spring, H, whose ends bear against the ends $f^2$ of the yoke and the top $d$ of the pedestal, and thus upon these springs that part of the car-body is supported.

I prefer that the bolts G shall fit easily in the holes $f^3$, so that they may oscillate to a slight extent on the ends $f^2$ as the yoke oscillates in its saddle $e$.

I claim as my invention—

1. The combination, with a car-pedestal having a top and the axle-box, of a yoke adapted to oscillate in a bearing on the axle-box, and having ends turned outwardly, springs situated between the latter and the pedestal-top on each side of the axle-box, bolts passing through the springs, pedestal-top, and the yoke ends, and nuts placed upon the lower ends of said bolts, adapted to engage said yoke, substantially as and for the purpose set forth.

2. The combination of the axle-box, the yoke having parts $f f' f^2$, the pedestal, springs, and coupling-bolts, the parts $f^2$ of the yoke being provided with upwardly-flaring sockets, substantially as and for the purpose set forth.

WILLIAM SUTTON.

In presence of—
BENJN. A. KNIGHT,
EDW. S. KNIGHT.